Apr. 24, 1923.

G. T. HEMSLEY 1,453,009

TOP SCREW FOR GILL DRAWING FRAMES

Filed June 19, 1922

George T. Hemsley
INVENTOR.

BY

Gardner W. Pearson
ATTORNEY.

Patented Apr. 24, 1923.

1,453,009

UNITED STATES PATENT OFFICE.

GEORGE T. HEMSLEY, OF LAWRENCE, MASSACHUSETTS.

TOP SCREW FOR GILL-DRAWING FRAMES.

Application filed June 19, 1922. Serial No. 569,336.

*To all whom it may concern:*

Be it known that I, GEORGE T. HEMSLEY, a citizen of Great Britain, residing at Lawrence, in the county of Essex and State of Massachusetts, have invented certain new and useful Improvements in Top Screws for Gill-Drawing Frames, of which the following is a specification.

My invention relates to gill-drawing frames and consists of improvements in the construction and arrangement of the top-screws therefor.

One object of the invention is to provide an improved means for mounting the faller-cam on the top-screw whereby its cam-faces will bear a definite relation to the threads of the screw; and whereof the cam may be easily removed and replaced by a new cam which will invariably assume the correct relation to the screw-threads without adjustment or fitting.

Another object of the invention is to provide an improved end-bearing for the top-screw, said bearing forming part of the faller-cam and being adapted to provide an enlarged bearing surface whereby to insure greater durability, and to greatly strengthen the cam. As said bearing is a boss integral with the cam, there is no possibility of fibre getting between them and there is nothing to be screwed looser or tighter by the action of the top-screw. The relation between the cam and top-screw must always remain the same.

A set of top-screws is very expensive. Where such a screw is provided with a stud projecting from the end on which the faller-cam is mounted, as has been and is the universal custom, and by reason of the nut means for fastening the cam to the screw being tightened too much on said stud, it is twisted off, it is necessary to throw away the whole screw or to go through a very expensive process to repair it.

I use no stud on the top screw but use a squared end and while my cam is much stronger than many others, if anything breaks it will be the cam, which is comparatively inexpensive and can easily be replaced.

I so locate my cam screw that it passes into the cam from the outside and there can be no tendency for it to be tightened by the action of the top screw. I also provide means between the cam and top screw to prevent one from turning with reference to the other.

In the drawings, Fig. 1 is a side elevation of the top screw of a gill-drawing frame, showing it mounted in its bearings in operative relation with its corresponding bottom screw.

Figure 1:
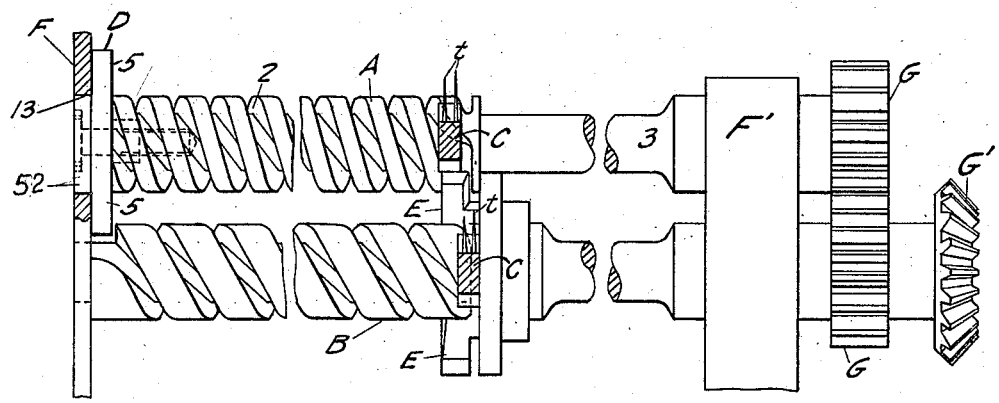
Figure 2:
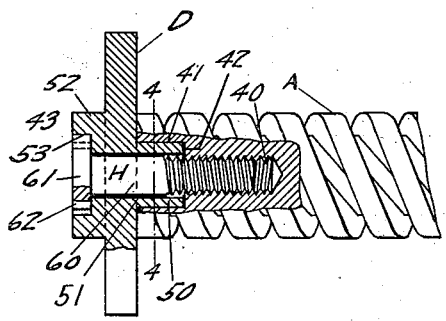
Fig. 2 is a detail side elevation on a larger scale of the end of the top screw with the faller cam and its attaching parts in place, some parts being broken to show the interior construction.
Figure 3:
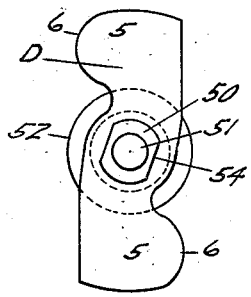
Fig. 3 is an elevation from the inside of my faller cam.
Figure 4:
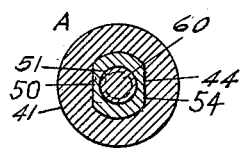
Fig. 4 is a section on the line 4—4 of Fig. 2.
Figure 5:
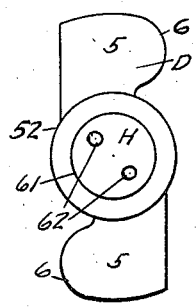
Fig. 5 is an elevation from the outside of my faller cam with the preferred method of attaching it to the top screw. It is an elevation from the left of Fig. 2.

Referring to Fig. 1 of the drawings, the operating mechanism of the gill-drawing frame comprises, in general, two sets of top- and bottom-screws A and B (only one set being herein shown) arranged in opposite, parallel relation and adapted to traverse the gill-bars or fallers C back and forth in the machine. The faller-bars or combs C are supported to slide on horizontal guides or saddles, not herein shown, with their ends engaging the threads in the opposite screws to cause them to be traversed therefrom. The top-screws A propel the fallers C in one direction, and as they reach the end of their operative stroke they are carried down into engagement with the threads of the bottom-screws B, whereby they are traversed back in the opposite direction and then lifted and returned again to the top-screws. In this way a continuous movement is imparted to the fallers to pass them back and forth in horizontal paths at different levels. As the fallers C reach the end of the top-screws A they ride out of the screw-threads thereof and also slide off from the ends of the top-saddles. At this point they are operated upon by the faller-cams D at the ends of the top-screws A which come into contact with the bars to force them down into engagement with the bottom-screws B. The bars C are then returned to the opposite end of the bottom-screws B and as they ride out of the threads thereof another set of cams E, carried by the bottom-screws, act to lift them into position to engage their ends with the top-screws once more. The above described arrangement is common to practically all types of gill-drawing frames.

Fig. 1 illustrates only one set of top- and bottom-screws, A and B, but it will be understood that these parts are duplicated on the opposite side of the machine; the faller-bars C being arranged to extend horizontally between the two opposite screws of each pair to engage their ends with the threads of the latter. As shown in Fig. 1, the top- and bottom-screws A and B are journaled in upright bearings F and F' supported from the machine frame, and at one end they are connected rotatively by means of intermeshing spur-gears G—G. On the outer end of the bottom-screw B is a bevel-gear G' through which both screws are driven from the main power-shaft of the machine, not herein shown. On one side of the machine both the top- and bottom-screws A—B have right-hand threads, as shown in Fig. 1, while the threads of the opposite set of screws, not herein illustrated, are left-handed. The top- and bottom-screws A—B of each set are rotated in opposite directions, the arrangement being such that the fallers C will be traversed to the left, as viewed in Fig. 1, by the top-screws, and to the right by the bottom-screws. The fallers C consist of relatively narrow, flat bars having chamfered ends adapted to be received within the helical grooves of the threads of the screws A—B with the bars extending in horizontal relation therebetween. Intermediate their ends the bars C are cut away at top and bottom to reduce their width, and are studded along the upper edge with two rows of closely-shaped, sharpened pins or teeth $t$ which form the comb for operating on the material passing through the gill-box or frame.

As before indicated, my present invention relates particularly to the top-screw A, its cam D, and the means for mounting the screw in its end-bearing. The screw A is usually constructed from a single length of rod or shaft having the enlarged square-threaded portion 2 at one end and the reduced shank portion 3 at the other. The threads of the screw are of double pitch or, in other words, there are two threads extending the length of the screw 2 and terminating at diametrically opposite points at its ends. The cam-member D is secured to the outer end of the screw 2 and consists essentially of a flat bar or plate having opposite radial arms 5 formed with projecting cam-faces 6 on their sides. Each of the cam-faces 6 functions in connection with its respective screw-thread to which it must bear a certain definite relation in order that it may properly engage the faller-bar as it emerges from the end of the thread-groove. Heretofore it has been the usual practice to provide a threaded stud or extension at the end of the screw 2 to adapt the cam D to be screwed onto it to seat against the screw, or to provide such a stud with flat sides to fit a similar bore in the cam and to screw onto this stud a nut or collar. As before stated, the cam-faces 6 on the cam-member D must bear a certain definite relation to the points where the grooves of the screw-threads emerge at the end of the screw in order that the engagement of the cams with the faller-bars will be timed synchronously with the disengagement of the bars from the screw. That is to say, the cam-faces 6 must be brought into engagement with the tops of the faller-bars C, see Fig. 1, just as the latter slide out of the thread-grooves at the end of the screw. If this engagement is made too soon the bars will be jammed in the threads of the screw, resulting in straining or breaking the parts; while if the engagement is delayed the bars will not be carried down at the proper instant to enter the leading ends of the threads on the bottom-screws. It will thus be seen that the cam-member D must be set very accurately in relation to the screw-threads.

In the end of the shaft of the top screw, such as A, I form a threaded axial hole 40 and at the outer end of this I provide a stem recess 41 whereby there will be a shoulder 42 between these parts.

I prefer that the bore 40 should be axial although it might be off center, and I prefer to provide stem recess 41 with a flattened side 44 or with two or more flattened sides if desired. The object of this stem recess is to prevent the stem 50 of cam D from turning, and it is obvious that this purpose can be accomplished if both are of any other shape except cylindrical.

I make integral with my faller cam D at one side the stem 50 so formed as to fit accurately in stem recess 41 preferably having at least one flat side such as 54 and a bore 51 which, when the stem is in place in the stem recess, will register with and be in continuation of the axial hole 40.

On the other side of cam D I provide an annular projecting bearing 52 the outside of which is a circle, the center of which is the axis of screw A whereby this serves as a bearing for the end of the screw as it is formed to fit a bore 13 in the vertical plate F which forms the end support for the top screw. Inside this bearing 52 is a countersunk head recess 53 of such size as to snugly receive the head 61 of a fastening screw H which has a shank 60 which fits the bore 51 and is provided with threads to engage the threads in hole 40 in screw A. Preferably, head 61 is provided with wrench holes 62 whereby it can be screwed in or out by means of a suitable pronged wrench of a well known type.

As indicated above, the main principle of my invention is to get rid of the stud on the end of the top screw so that it may have a squared end to which without its turning I can attach a cam having a reinforcing boss on the outer side such boss serving as a bearing for the top screw.

Figure 6:
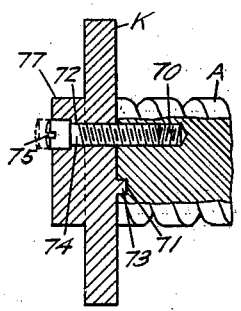
Fig. 6 is a vertical sectional view of a modified form of my top screw and faller cam with the means of attaching them together.

It is obvious that I might attach the cam and top screw together in various ways besides my preferred construction shown in Figs. 1 to 5 as, for instance, as shown in Fig. 6.

In Fig. 6, A is a top screw having a squared end into which is bored an attaching screw hole 70 and a recess 71. The cam K has the bearing boss 77 on the outer side and a bore 72 for an attaching screw 74 with a head 75 which, preferably, fits into a recess in the boss, although it is obvious that it might project as shown by the dotted lines provided there was sufficient space. A projection 73 enters recess 71 to prevent the cam from turning on the screw.

Figure 7:
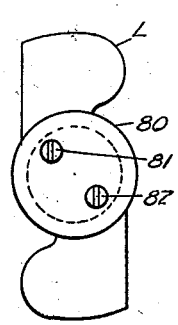
Fig. 7 is an end elevation similar to Fig. 5 showing another modification of my top screw and faller cam with another method of attaching them together.

As shown in Fig. 7, I may use a similar construction omitting the recess 71 and projection 73 and using in place thereof an additional attaching screw 82 which may be considered the means to prevent cam L and its boss 80 from turning on the end of the top screw, while 81 may be considered the attaching screw therefor.

I claim:

1. An improved top-screw for gill-drawing frames comprising a shaft having screw threads on its exterior extending in from its outer end, a stem recess having a flattened side and a threaded axial hole, a faller-cam having on the inside a stem which fits the stem recess and a bore which registers with the axial hole and having on the outside an annular projecting boss which serves as a bearing for the end of the screw and has a countersunk head recess, and a fastening screw having a shank which passes through said bore into said hole and a head which fits said countersunk recess.

2. An improved top-screw for gill-drawing frames comprising a shaft having screw threads on its exterior extending in from its outer end, a stem recess and a threaded hole, a faller-cam having on the inside a stem which fits the stem recess and a bore which registers with the axial hole and having on the outside a projecting boss which serves as a bearing for the end of the screw, and a fastening screw having a shank which passes through said bore into said hole.

3. An improved top-screw for gill-drawing frames comprising a shaft having screw threads on its exterior extending in from its outer end, a threaded hole, a faller-cam having a bore which registers with the hole and having on the outside a projecting boss which serves as a bearing for the end of the top screw, and a fastening screw having a shank which passes through said bore into said hole, together with means between the cam and top screw to prevent the cam from turning with reference to said top screw.

4. An improved top-screw for gill-drawing frames comprising a shaft having screw threads on its exterior extending in from its outer end, which outer end is flat faced, a faller-cam having on its outside a projecting boss which serves as a bearing for the end of said top-screw, and means to fasten the top-screw and faller-cam together and to prevent them from turning with reference to each other.

5. A faller-cam having on its outside a projecting boss which serves as a bearing and means to prevent it from turning on a top-screw.

GEORGE T. HEMSLEY.